United States Patent [19]

Funk et al.

[11] Patent Number: 4,473,442
[45] Date of Patent: Sep. 25, 1984

[54] ACID REGENERATOR CONTROL

[75] Inventors: Gary L. Funk; James A. Feldman, both of Bartlesville, Okla.

[73] Assignee: Phillips Petroleum Company, Bartlesville, Okla.

[21] Appl. No.: 350,684

[22] Filed: Feb. 22, 1982

[51] Int. Cl.³ .............................................. B01D 3/42
[52] U.S. Cl. ...................................... 203/2; 202/160; 202/206; 364/501
[58] Field of Search ............... 364/500, 496, 501, 502, 364/162, 163, 164; 502/6, 56; 585/723; 202/160, 206; 203/2

[56] References Cited

U.S. PATENT DOCUMENTS

| | | | |
|---|---|---|---|
| 3,050,450 | 8/1962 | Kleiss et al. | 364/501 |
| 3,354,053 | 11/1967 | Johnson | 364/164 |
| 3,356,590 | 12/1967 | Johnson | 364/164 |
| 3,420,748 | 1/1969 | Johnson et al. | 364/164 |
| 3,428,528 | 2/1969 | Oglesby, Jr. et al. | 364/164 |
| 4,111,218 | 9/1978 | Hobbs | 364/162 |

Primary Examiner—Errol A. Krass
Assistant Examiner—Clifford L. Tager

[57] ABSTRACT

In an alkylation process in which an acid regenerator is utilized to separate an acid catalyst from acid soluble oil contained in a spent acid catalyst stream, the heat input to the acid regenerator is manipulated based on the feed flow rate of the spent acid catalyst stream so as to maintain a substantially constant heat input per pound of feed flowing to the acid regenerator and the liquid level in the acid regenerator is manipulated so as to maintain the acid catalyst and acid soluble oil interface in the acid regenerator at a desired level. Such manipulation of the heat input to and the liquid level in the acid regenerator results in a substantially optimum separation of acid catalyst from acid soluble oil.

14 Claims, 1 Drawing Figure

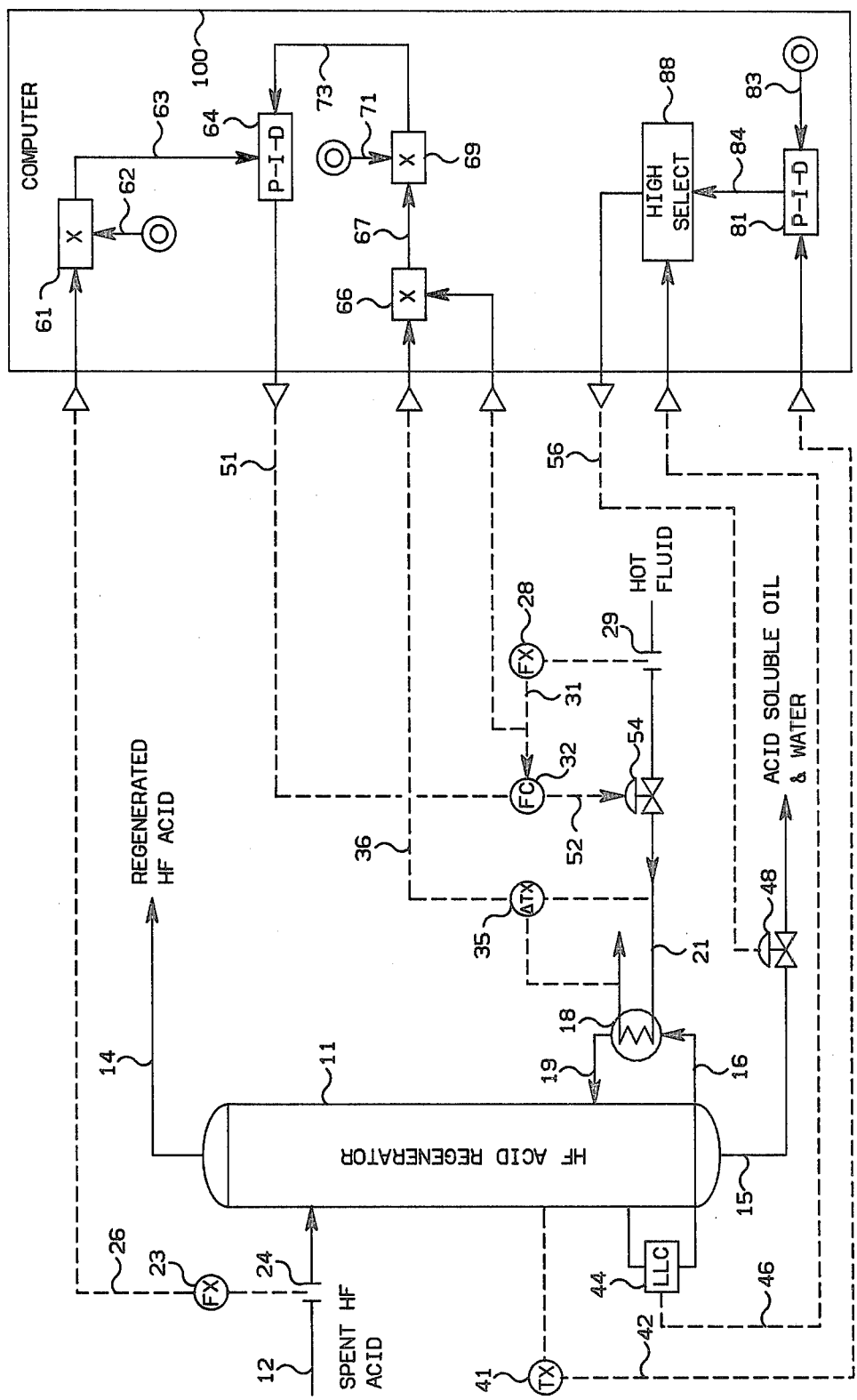

ACID REGENERATOR CONTROL

This invention relates to acid regeneration in an alkylation process. In one aspect this invention relates to control of the heat input to an acid regenerator. In another aspect this invention relates to control of the liquid level in an acid regenerator.

In a typical alkylation process in which an acid catalyst such as hydrofluoric acid or sulfuric acid is used, a spent acid stream is provided to an acid regenerator. Typically, the spent acid stream will contain acid soluble oil, water and acid. The acid regenerator is typically a stripping column in which heat and/or a stripping fluid is utilized to separate the acid from the acid soluble oil and water. Generally, the separated acid is removed as an overhead stream from the acid regenerator while the acid soluble oil and water are removed as a bottom stream.

As has been previously stated, heat is generally utilized to separate the acid from the acid soluble oil and water. If too much heat is supplied to the acid regenerator, energy is wasted and acid soluble oil may be boiled off in the overhead stream. It is particularly undesirable for the regenerated acid stream to contain acid soluble oil. If too little heat is utilized, acid will be removed in the bottom stream which is particularly undesirable from an economic standpoint since 15 to 25 tons of acid can be lost per month in a large alkylation unit if too little heat is supplied to the acid regenerator.

The surface of the liquid in an acid regenerator forms an interface between the acid soluble oil and acid. It is important that this interface be maintained at a desired level if an optimum separation between acid and acid soluble oil is to be obtained.

It is thus an object of this invention to provide control of the heat input to an acid regenerator and control of the liquid level in an acid regenerator so as to maintain an optimum separation of acid from acid soluble oil and water contained in the spent acid feed stream to the acid regenerator.

In accordance with the present invention, method and apparatus is provided whereby the heat input to the acid regenerator is manipulated based on the feed flow rate so as to maintain a substantially constant heat input per pound of feed flowing to the acid regenerator and the liquid level in the acid regenerator is manipulated so as to maintain the acid and acid soluble oil interface in the acid regenerator at a desired level. Such manipulation of the heat input to and liquid level in the acid regenerator results in a substantially optimum separation of acid from acid soluble oil and water which results in considerable economic benefits for an alkylation process.

Other objects and advantages of the invention will be apparent from the foregoing brief description of the invention and the claims as well as the detailed description of the drawing which is briefly described as follows:

FIG. 1 is a diagrammatic illustration of an acid regenerator with the associated control system of the present invention.

The invention is illustrated and described in terms of a specific acid regenerator configuration and, since hydrofluoric (HF) acid is the most commonly used acid, the invention is described in terms of the use of the HF acid to catalyze the alkylation reaction. However, the invention is applicable to any acid regenerator configuration where it is desired to control the heat input to the acid regenerator and the liquid level in the acid regenerator and is applicable to the use of other acid catalyst such as sulfuric acid.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Oklahoma.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to FIG. 1, there is illustrated an HF acid regenerator 11. A spent HF acid feed stream is provided to the HF acid regenerator 11 through conduit means 12. As has been previously stated, the spent HF acid feed stream will generally contain acid soluble oil, water and HF acid.

HF acid contained in the spent HF acid feed stream is removed from the HF acid regenerator 11 as an overhead stream through conduit means 14. Acid soluble oil and water are removed from the HF acid regenerator 11 as a bottoms stream through conduit means 15. Since a complete separation is not generally possible, some HF acid will generally be removed in the bottoms stream while some acid soluble oil may be present in the overhead stream. However, it is the purpose of this invention to substantially maximize separation so as to substantially reduce the loss of HF acid in the bottoms stream and the presence of acid soluble oil in the overhead stream.

A liquid stream is also withdrawn from the HF acid regenerator through conduit means 16, passed through the heat exchanger 18 and returned to the HF acid regenerator through conduit means 19. Heat is supplied to the liquid stream flowing through conduit means 16 by the hot fluid which flows to the heat exchanger 18 through conduit means 21. This hot fluid would typically be steam or hot oil.

The HF acid regenerator described to this point is a typical HF acid regenerator. It is noted that the HF acid regenerator might also be supplied with a stripping gas such as isobutane. Also, a reflux may be supplied to the HF acid regenerator, or the feed stream flowing through conduit means 12 may be split with a portion of the feed stream being used as a reflux. Such stripping streams and reflux streams have not been illustrated for the sake of simplicity because these stripping and reflux streams are well known to those skilled in the art and these streams play no part in the description of the present invention. Also, additional equipment such as pumps, additional heat exchangers, additional control components, etc. which would typically be associated with an HF acid regenerator have not been illustrated since these additional components play no part in the description of the present invention.

In general, control of the HF acid regenerator according to the present invention is accomplished by using process measurements to establish two control signals. The process measurements will first be described and then the use of the control signals will be described. Thereafter, the manner in which the process measurements are utilized to generate the control signals will be described.

Flow transducer 23 in combination with the flow sensor 24, which is operably located in conduit means 12, provides an output signal 26 which is representative of the actual flow rate of the feed stream flowing through conduit means 12. Signal 26 is provided from the flow transducer 23 as an input to computer 100.

In like manner, flow transducer 28 in combination with the flow sensor 29, which is operably located in conduit means 21, provides an output signal 31 which is representative of the flow rate of the hot fluid flowing through conduit means 21. Signal 31 is provided from the flow transducer 28 as the process variable input to the flow controller 32 and is also provided as an input to computer 100.

The differential temperature transducer 35 in combination with temperature sensing devices such as thermocouples, which are operably located so as to measure the temperature of the hot fluid flowing through conduit means 21 before and after passage through the heat exchanger 18, provides an output signal 36 which is representative of the difference in the temperature of the hot fluid flowing through conduit means 21 before and after passage through the heat exchanger 18. Signal 36 is provided from the differential temperature transducer 35 as an input to computer 100.

Temperature transducer 41 in combination with a temperature sensing device such as a thermocouple, which is operably located at a desired level in the HF acid regenerator 11, provides an output signal 42 which is representative of the temperature in the HF acid regenerator at the level at which the temperature sensing device is located. Signal 42 is provided from the temperature transducer 41 as an input to computer 100.

The liquid level controller 44 is operably connected to the HF acid regenerator 11 so as to be able to determine if the liquid level in the HF acid regenerator 11 is between the two sensing elements associated with the liquid level controller 44. It is noted that these two sensing elements could be located very close together so as to maintain a very precise liquid level in the HF acid regenerator but would typically be located some distance apart on the column since there is typically some freedom in the liquid level which will result in a substantially optimum separation of HF acid from acid soluble oil and water. The liquid level controller 44 provides an output signal 46 which is scaled so as to be representative of the position of the control valve 48, which is operably located in conduit means 15, required to maintain the liquid level in the HF acid regenerator 11 between the sensing elements associated with the liquid level controller 44. Signal 46 is provided as an input to the computer 100.

In response to the described inputs, computer 100 calculates two control signals. Signal 51 is representative of the flow rate of the hot fluid flowing through conduit means 21 required to maintain a substantially constant heat input per pound of feed flowing to the HF acid regenerator 11. Signal 51 is provided from computer 100 as the set point input to the flow controller 32.

In response to signals 31 and 51, the flow controller 32 provides an output signal 52 which is scaled so as to be representative of the position of the control valve 54, which is operably located in conduit means 21, required to maintain the actual flow rate of the hot fluid flowing through conduit means 21 substantially equal to the desired flow rate represented by signal 51. Signal 52 is provided from the flow controller 32 as the control signal to the control valve 54 and the control valve 54 is manipulated in response thereto.

Computer 100 also provides an output signal 56 which is representative of the position of the control valve 48 required to either maintain a desired liquid level in the HF acid regenerator 11 or prevent the liquid level from exceeding the level at which the temperature sensing element associated with temperature transducer 41 is located. Signal 56 is provided from computer 100 as a control signal to the control valve 48 and the control valve 48 is manipulated in response thereto.

It is noted that closer control of the flow rate of the bottom stream might be obtained by using a flow controller. However, the acid soluble oil is extremely corrosive and it is difficult to maintain a flow sensor in conduit means 15. Thus, signal 56 is preferably scaled so as to be representative of the desired valve position rather than a desired flow rate through conduit means 15 which enables the direct control of the control valve 48 in response to signal 56. However, it is noted that a signal which represents a desired valve position can be said to represent a desired flow rate since a particular valve position will generally correspond to a particular valve position. Thus, either a valve position or flow rate may be considered as being representative of the rate at which liquid should be withdrawn from the bottom of the HF acid regenerator 11.

Referring now to computer 100 and the manner in which the process measurements are utilized to generate the control signals, signal 26 is provided as an input to the multiplying block 61. The multiplying block 61 is also supplied with an operator entered signal 62 which is representative of the number of BTU's which must be supplied to the HF acid regenerator 11 per pound of feed in order to obtain a desired separation of HF acid from acid soluble oil and water. Signal 26 is multiplied by signal 62 to establish signal 63 which is representative of the number of BTU's per hour which must be supplied to the HF acid regenerator 11 in order to maintain a constant heat input to the HF acid regenerator 11 per pound of feed. Signal 63 is provided from the multiplying block 61 as the set point input to the controller block 64.

Signal 31 is provided as a first input to the multiplying block 66. Signal 36 is supplied as a second input to the multiplying block 66. Signal 31 is multiplied by signal 36 to establish signal 67 which is representative of the number of degrees F. being dropped by each pound of hot fluid per hour across the heat exchanger 18. Signal 67 will have the units of pound degree F. per hour. Signal 67 is supplied from the multiplying block 66 as a first input to the multiplying block 69.

The multiplying block 69 is also supplied with an operator entered signal 71 which is representative of the specific heat of the hot fluid flowing through conduit means 21. The specific heat for the hot fluid, such as steam, will generally be well known. Signal 71 will have the units of BTU per pound degree F. Signal 71 is multiplied by signal 67 to establish signal 73 which is representative of the actual number of BTU's being supplied to said HF acid regenerator per hour. Signal 73 is supplied from the multiplying block 69 as the process variable input to the controller block 64.

In response to signals 63 and 73, the controller block 64 establishes signal 51 which is responsive to the difference between signals 63 and 73. Signal 51 is provided as an output from computer 100 and is utilized as previously described.

Signal 42 is provided as the process variable input to the controller block 81. The controller block 81 is also provided with a triggering signal 83 which is representative of the maximum allowable temperature in the HF acid regenerator 11 at the level of the sensing device associated with the temperature transducer 41. In response to signals 42 and 83, the controller block 81 provides an output signal 84 which is representative of a closed valve position if signal 41 is below the triggering temperature and which is representative of a valve position which will reduce the liquid level in the acid regenerator 11 if signal 41 becomes equal to or greater than the triggering temperature. Signal 84 is supplied as an input to the high select block 88. In like manner, signal 46 is supplied as an input to the high select block 88. Signal 56 will be equal to the higher (more open position of control valve 48) of signals 46 and 84. Signal 56 is provided as an output from the high select 88 and computer 100 and is utilized as has been previously described.

It is noted that the temperature transducer 41 is a safety device. If the level controller 44 is functioning properly, the liquid level in the HF acid regenerator 11 should not reach the level of the sensing device associated with the temperature transducer 41. However, if the liquid level controller 44 should malfunction, which may occur because of the hostile environment at the bottom of the HF acid regenerator, the liquid level in the HF acid regenerator may rise to the level of the temperature sensor associated with the temperature transducer 41. If this should occur, the temperature represented by signal 42 will increase rapidly and the control signal 56 will become equal to signal 84 when signal 84 becomes representative of a more open valve position than signal 46. Thus, even if the level controller 44 malfunctions, some level control can be maintained by the temperature transducer 41. Essentially, the liquid level will rise to the level of the sensing element associated with the temperature transducer 41 and then will fall as the controller block 81 takes control. After the temperature drops at the sensing position, controller block 81 will lose control and liquid level may again rise until such time as the controller block 81 again takes control. Obviously, this will not result in maintenance of an optimum liquid level but will prevent dangerous liquid levels from occurring in the HF acid regenerator 11.

Signal 51 is a feed forward control signal since signal 51 is based on the feed flow rate. Thus, a change in the feed flow rate will automatically cause a change in the flow rate of the hot fluid through conduit means 21. Such feed forward control prevents off-specification operation during times of fluctuating feed rates.

The invention has been described in terms of a preferred embodiment as illustrated in FIG. 1. Specific component which can be used in the practice of the invention as illustrated in FIG. 1 such as flow sensors 24 and 29; flow transducers 23 and 28; temperature transducer 41; differential temperature transducer 35, flow controller 32 and control valves 54 and 48 are each well known, commercially available control components such as are described at length in Perry's *Chemical Engineer's Handbook*, 4th Edition, Chapter 22, McGraw-Hill.

Because of the hostile environment at the bottom of the HF acid regenerator 11, it may be necessary to utilize a special liquid level controller 44 comprising a Radiation-density type level sensor in conjunction with a conventional controller. Radiation-density sensors are well known commercially available components (e.g. Texas Nuclear, P.O. Box 9267, Austin, Tex.) described on page 22-48 of Perry's *Chemical Engineer's Handbook*.

While the invention has been described in terms of the presently preferred embodiment, reasonable variations and modifications are possible by those skilled in the art and such modifications and variations are within the scope of the described invention and the appended claims.

That which is claimed is:

1. Apparatus comprising:
   an acid regenerator column;
   means for supplying a feed stream containing an acid catalyst for an alkylation process and acid soluble oil to said acid regenerator column;
   means for removing an overhead stream containing a substantial portion of said acid catalyst contained in said feed stream from said acid regenerator column;
   means for removing a bottom stream containing a substantial portion of said acid soluble oil contained in said feed stream from said acid regenerator column;
   means for supplying heat to said acid regenerator column;
   means for establishing a first signal representative of the rate at which heat should be supplied to said acid regenerator column in order to maintain a substantially constant desired heat input to said acid regenerator column per unit of said feed stream;
   means for establishing a second signal representative of the actual rate at which heat is being supplied to said acid regenerator column;
   means for comparing said first signal and said second signal and for establishing a third signal which is responsive to the difference between said first signal and said second signal;
   means for manipulating the rate at which heat is supplied to said acid regenerator column in response to said third signal to thereby maintain the actual rate at which heat is supplied to said acid regenerator column substantially equal to the desired rate represented by said first signal;
   means for establishing a fourth signal representative of the rate at which liquid should be withdrawn from the bottom of said acid regenerator column as said bottom stream in order to maintain a desired liquid level in said acid regenerator column; and
   means for manipulating the flow rate of said bottom stream in response to said fourth signal.

2. Apparatus in accordance with claim 1 wherein said means for establishing said first signal comprises:
   means for establishing a fifth signal representative of the actual flow rate of said feed stream;
   means for establishing a sixth signal representative of the heat which must be supplied to said acid regenerator column per unit of said feed stream in order to maintain a substantially constant desired heat input to said acid regenerator column per unit of said feed stream; and
   means for multiplying said fifth signal by said sixth signal to establish said first signal.

3. Apparatus in accordance with claim 1 wherein said means for supplying heat to said acid regenerator column comprises:
   a heat exchanger;
   means for withdrawing a fluid stream from a lower portion of said acid regenerator column, for passing the thus withdrawn fluid stream through said heat exchanger and for returning the withdrawn fluid stream which has been heated to said acid regenerator column; and
   means for providing a heating fluid to said heat exchanger.

4. Apparatus in accordance with claim 3 wherein said means for establishing said second signal comprises:
   means for establishing a fifth signal representative of the actual flow rate of said heating fluid;
   means for establishing a sixth signal representative of the difference between the temperature of said heating fluid before said heating fluid passes through said heat exchanger and the temperature of said heating fluid after said heating fluid passes through said heat exchanger;
   means for multiplying said fifth signal and said sixth signal to establish a seventh signal;
   means for establishing an eighth signal representative of the specific heat of said heating fluid; and
   means for multiplying said seventh signal and said eighth signal to establish said second signal.

5. Apparatus in accordance with claim 4 wherein said means for manipulating the rate at which heat is supplied to said acid regenerator column in response to said third signal comprises:
   a control valve operably located so as to control the flow rate of said heating fluid;
   means for comparing said third signal and said fifth signal and for establishing a ninth signal which is responsive to the difference between said third signal and said fifth signal, wherein said ninth signal is scaled so as to be representative of the position of said control valve required to maintain the actual rate of heat input to said acid regenerator column substantially equal to the desired rate of heat input represented by said first signal; and
   means for manipulating the position of said control valve in response to said ninth signal.

6. Apparatus in accordance with claim 1 wherein said means for manipulating the flow rate of said bottom stream in response to said fourth signal comprises:

a control valve operably located so as to control the flow rate of said bottom stream; and means for manipulating the position of said control valve in response to said fourth signal, wherein said fourth signal is scaled so as to be representative of the position of said control valve required to maintain a desired liquid level in said acid regenerator column.

7. Apparatus in accordance with claim 6 additionally comprising:

means for establishing a fifth signal representative of the temperature in said acid regenerator column at a point above the desired liquid level in said acid regenerator column;

means for establishing a sixth signal representative of the maximum desired temperature at said point;

means for comparing said fifth signal and said sixth signal and for establishing a seventh signal which is responsive to the difference between said fifth signal and said sixth signal, wherein said seventh signal is representative of a closed position of said control valve if the temperature represented by said fifth signal is less than the temperature represented by said sixth signal and is representative of a position of said control valve which will reduce the liquid level in said acid regenerator column if the temperature represented by said fifth signal is equal to or greater than the temperature represented by said sixth signal, wherein said control valve is manipulated in response to the one of said fourth and seventh signals which is representative of the more open position of said control valve.

8. A method for controlling the separation of an acid catalyst, for an alkylation process, from acid soluble oil, wherein a feed stream containing said acid catalyst and said acid soluble oil is supplied to an acid regenerator column, wherein an overhead stream containing a substantial portion of the acid catalyst contained in said feed stream is removed from said acid regenerator column as an overhead stream, wherein a substantial portion of said acid soluble oil contained in said feed stream is removed from said acid regenerator column in a bottoms stream and wherein heat is supplied to said acid regenerator column to effect the separation of said acid catalyst from said acid soluble oil, said method comprising the steps of:

establishing a first signal representative of the rate at which heat should be supplied to said acid regenerator column in order to maintain a substantially constant desired heat input to said acid regenerator column per unit of said feed stream;

establishing a second signal representative of the actual rate at which heat is being supplied to said acid regenerator column;

comparing said first signal and said second signal and establishing a third signal which is responsive to the difference between said first signal and said second signal;

manipulating the rate at which heat is supplied to said acid regenerator column in response to said third signal to thereby maintain the actual rate at which heat is supplied to said acid regenerator column substantially equal to the desired rate represented by said first signal;

establishing a fourth signal representative of the rate at which liquid should be withdrawn from the bottom of said acid regenerator column as said bottom stream in order to maintain a desired liquid level in said acid regenerator column; and manipulating the flow rate of said bottom stream in response to said fourth signal.

9. A method in accordance with claim 8 wherein said step of establishing said first signal comprises:

establishing a fifth signal representative of the actual flow rate of said feed stream;

establishing a sixth signal representative of the heat which must be supplied to said acid regenerator column per unit of said feed stream in order to maintain a substantially constant desired heat input to said acid regenerator column per unit of said feed stream; and multiplying said fifth signal by said sixth signal to establish said first signal.

10. A method in accordance with claim 8 wherein heat is supplied to said acid regenerator column by withdrawing a fluid stream from a lower portion of said acid regenerator column, passing the thus withdrawn fluid stream through a heat exchanger which is provided with a heating fluid and returning the withdrawn fluid stream, which has been heated, to said acid regenerator column.

11. A method in accordance with claim 10 wherein said step of establishing said second signal comprises:

establishing a fifth signal representative of the actual flow rate of said heating fluid to said heat exchanger;

establishing a sixth signal representative of the difference between the temperature of said heating fluid before said heating fluid passes through said heat exchanger and the temperature of said heating fluid after said heating fluid passes through said heat exchanger;

multiplying said fifth signal and said sixth signal to establish a seventh signal;

establishing an eighth signal representative of the specific heat of said heating fluid; and multiplying said seventh signal and said eighth signal to establish said second signal.

12. A method in accordance with claim 11 wherein said step of manipulating the rate at which heat is supplied to said acid regenerator column in response to said third signal comprises:

comparing said third signal and said fifth signal and establishing a ninth signal which is responsive to the difference between said third signal and said fifth signal, wherein said ninth signal is scaled so as to be representative of the position of a control valve, operably located so as to control the flow rate of said heating fluid, required to maintain the actual rate of heat input to said acid regenerator column substantially equal to the desired rate of heat input represented by said first signal; and manipulating the position of said control valve in response to said ninth signal.

13. A method in accordance with claim 8 wherein said step of manipulating the flow rate of said bottom stream in response to said fourth signal comprises manipulating the position of a control valve, operably located so as to control the flow rate of said heating fluid in response to said fourth signal, wherein said fourth signal is scaled so as to be representative of the position of said control valve required to maintain a desired liquid level in said acid regenerator column.

14. A method in accordance with claim 13 additionally comprising the steps of:

establishing a fifth signal representative of the temperature in said acid regenerator column at a point above the desired liquid level in said acid regenerator column;

establishing a sixth signal representative of the maximum desired temperature at said point;

comparing said fifth signal and said sixth signal and establishing a seventh signal which is responsive to the difference between said fifth signal and said sixth signal, wherein said seventh signal is representative of a closed position of said control valve if the temperature represented by said fifth signal is less than the temperature represented by said sixth signal and is representative of a position of said control valve which will reduce the liquid level in said acid regenerator column if the temperature represented by said fifth signal is equal to or greater than the temperature represented by said sixth signal, wherein said control valve is manipulated in response to the one of said fourth and seventh signals which is representative of the more open position of said control valve.

* * * * *